(12) United States Patent
Papafagos (10) Patent No.: US 11,179,986 B2
(45) Date of Patent: Nov. 23, 2021

(54) EXTENSION BRACKET FOR SLIDER BAR EXTENSION FOR PNEUMATIC/ELECTRICAL LINES

(71) Applicant: Tectran Mfg. Inc., Cheektowaga, NY (US)

(72) Inventor: James C. Papafagos, North Java, NY (US)

( * ) Notice: Subject to any disclaimer, the term of this patent is extended or adjusted under 35 U.S.C. 154(b) by 268 days.

(21) Appl. No.: 16/601,842

(22) Filed: Oct. 15, 2019

(65) Prior Publication Data

US 2020/0114712 A1  Apr. 16, 2020

Related U.S. Application Data

(60) Provisional application No. 62/745,776, filed on Oct. 15, 2018.

(51) Int. Cl.
| | | |
|---|---|---|
| *B60D 1/62* | (2006.01) | |
| *B60R 16/02* | (2006.01) | |
| *B60R 16/08* | (2006.01) | |
| *B62D 49/00* | (2006.01) | |

(52) U.S. Cl.
CPC ............ *B60D 1/62* (2013.01); *B60R 16/0215* (2013.01); *B60R 16/08* (2013.01); *B62D 49/005* (2013.01)

(58) Field of Classification Search
CPC ....... B60D 1/62; B60R 16/0215; B60R 16/08; B62D 49/005
USPC ... 248/633, 58, 60, 68.1, 70, 73, 200.1, 693, 248/610, 632, 634, 644, 674, 49, 51, 52, 248/65, 89, 214, 215, 317, 323, 503, 505, 248/507, 509
See application file for complete search history.

(56) References Cited

U.S. PATENT DOCUMENTS

| | | | | |
|---|---|---|---|---|
| 2,554,176 | A * | 5/1951 | Edwards ................. | B60R 11/00 224/317 |
| 2,948,450 | A * | 8/1960 | Dobrikin .................. | B60D 1/62 224/317 |
| 3,289,983 | A * | 12/1966 | Mennerdahl ............ | B66C 13/12 248/60 |

(Continued)

OTHER PUBLICATIONS

Slide Bar and 24" Rubber Hose Suspender Kit [online]. Retrieved from Anything Truck.com website on Nov. 2, 2020; Internet:<URL:https://www.anythingtruck.com/product/810-580066.html>.

(Continued)

*Primary Examiner* — Christopher Garft
*Assistant Examiner* — Michael McDuffie
(74) *Attorney, Agent, or Firm* — Verrill Dana, LLP (57) ABSTRACT

An extension bracket for a slider bar comprising a first curved tubular member affixed to a first end of a slider bar and a second end extending below the slider bar, spaced from a wall of a tractor unit. A second curved tubular member is affixed to a second end of the slider bar and a second end extending below the slider bar, spaced from the wall. There is a tubular cross member affixed to a portion of the first curved member to a portion of the second curved member. There is a tubular mounting member having first and second ends connected, respectively, to the second end of the first curved tubular member and to the second end of the second curved tubular member. The tubular mounting member also has a mid-section between the first and second end sections which is in contact with the wall of the tractor unit.

8 Claims, 6 Drawing Sheets

(56) References Cited

U.S. PATENT DOCUMENTS

| | | | | | |
|---|---|---|---|---|---|
| 3,420,546 | A | * | 1/1969 | Jasovsky | B60D 1/62 280/421 |
| 3,650,545 | A | * | 3/1972 | Freed | B62D 33/06 280/421 |
| 3,848,786 | A | * | 11/1974 | Baxter | B60P 7/12 224/546 |
| 4,353,518 | A | * | 10/1982 | Taylor | H05K 7/1491 248/281.11 |
| 4,691,851 | A | * | 9/1987 | Aaserude | B60R 11/00 224/482 |
| 5,687,937 | A | * | 11/1997 | Habib | F16L 3/18 248/51 |
| 5,738,312 | A | * | 4/1998 | Koch | F16L 3/22 248/230.5 |
| 6,902,180 | B2 | * | 6/2005 | Baginski | B60D 1/62 248/58 |
| 7,093,727 | B2 | * | 8/2006 | Musico | A47F 5/0838 108/29 |
| 7,352,947 | B2 | * | 4/2008 | Phung | G02B 6/4459 248/49 |
| 8,408,501 | B2 | * | 4/2013 | Noyes | B60D 1/62 248/75 |
| 8,657,324 | B2 | * | 2/2014 | Waldner | B60R 16/0215 280/423.1 |
| 10,544,882 | B2 | * | 1/2020 | Peterson | H02G 3/263 |
| 2004/0079717 | A1 | * | 4/2004 | Klein | A47B 81/02 211/119.004 |
| 2006/0006276 | A1 | * | 1/2006 | Wyatt | B65D 25/22 242/588 |
| 2009/0172876 | A1 | * | 7/2009 | Hendrickson | A47K 10/08 4/638 |
| 2009/0173704 | A1 | * | 7/2009 | Kotajarvi | B60R 9/06 211/88.04 |
| 2015/0167865 | A1 | * | 6/2015 | Koss | F16L 3/137 248/70 |
| 2015/0204549 | A1 | * | 7/2015 | Jacobs | B60R 11/00 248/68.1 |
| 2015/0305519 | A1 | * | 10/2015 | Brahar | G09F 7/18 29/428 |
| 2016/0107541 | A1 | * | 4/2016 | Formenti | F16L 3/00 248/63 |

OTHER PUBLICATIONS

X-Tend Tracker Bar Extension by Philips [online]. Retrieved from Raney's website on Nov. 2, 2020. Internet: <URL: https://www.raneystruckparts.com/x-tend-tracker-bar-extension-by-phillips/?gclid=Cj0KCQjw11v0BRDaARIsAGTWD1vCJRVdbi5P0goHbZ_ynuOTQvwlr-Y3stjTb5egD8knngSQoUEw7Y0aAhbxEALw_wcB>.

* cited by examiner

EXTENSION BRACKET FOR SLIDER BAR EXTENSION FOR PNEUMATIC/ELECTRICAL LINES

CROSS-REFERENCE TO RELATED APPLICATIONS

This application claims the benefit of priority to U.S. Provisional Application No. 62/745,776, filed Oct. 15, 2018, entitled "SUSPENSION BAR EXTENSION AND SPRING TENDER KIT FOR PNEUMATIC/ELECTRICAL LINES," which is incorporated herein by reference.

FIELD OF THE INVENTION

This invention relates to slider bar extension brackets used to suspend hookup lines in tractor trailer units and more particularly such slider bar extension brackets which more effectively suspend such lines, thus reducing wear on the lines and the tractor trailer and improving ease of use.

BACKGROUND OF THE INVENTION

The suspension of pneumatic, electrical, hydraulic or other hookup (interconnection) lines between one piece of equipment and another in a fashion that enables the connection points on either end of the equipment to be accessible while keeping these lines from rubbing on objects or getting into the proximity of heat sources, other moving parts or preventing human access, is an important and challenging problem in the transportation field, in particular, in the trucking industry.

To address this, slider or suspension bar(s) are used to place tractor-trailer hook-up lines away from the tractor unit (i.e. tractor cab) and suspended off the tractor catwalk while allowing movement laterally and to the rear of the tractor trailer to enable lines to move as they need to during the articulation of the tractor cab and trailer to minimize stress on the trailer connections. However, slider bars create very little clearance between the hook-up lines and the back of the cab. This makes it difficult to mount other equipment against the back of the cab without interfering with the connection lines and also results in the hook-up lines tending to hit the cab during service which can damage the cab paint. Often the slider bars provide inadequate slack for connections.

Another solution uses a slider bar extension device with a fixed bracket to hold the lines out further from the back of the cab to eliminate the aforementioned issues, but this device also eliminates the essential function of the slider bar, which is to allow the connection lines to slide laterally along the bar to extend their reach during sharp tractor-trailer turns.

BRIEF SUMMARY OF THE INVENTION

A primary object of this disclosure is to increase the amount of clearance between the connection lines and the back of the cab to create extra space to mount equipment against the back of the cab and to prevent the connection lines from hitting the back of the cab while in service and damaging the paint. Also, it is an object to achieve the foregoing while also maintaining the original function of the slider bar, which is to allow the lines to slide laterally along the bar to extend their reach during sharp tractor-trailer turns.

In a first aspect the invention includes an extension bracket for a slider bar configured to be mounted on a wall of a tractor unit of a semi-tractor trailer truck. The extension bracket includes a curved tubular member having a first end with a first attachment mechanism configured to be affixed to a first end of the slider bar and a second end configured to extend below the slider bar and spaced from the wall of the tractor unit when the slider bar is mounted on the wall of the tractor unit. There is a second curved tubular member having a first end with a second attachment mechanism configured to be affixed to a second end of the slider bar, spaced from the first end along the slider bar, and a second end configured to extend below the slider bar and spaced from the wall of the tractor unit when the slider bar is mounted on the wall of the tractor unit. There is a tubular cross member affixed at a first end to a portion of the first curved member between the first and second ends of the first member and the tubular cross member affixed at a second end to a portion of the second curved member between the first and second ends of the second member. There is a tubular mounting member having a first end section connected to the second end of the first tubular member and a second end section connected to the second end of the second tubular member. The tubular mounting member also having a mid-section interconnected between the first and second end sections, wherein the mid-section is configured to be in contact with the wall of the tractor unit.

In other aspects, one or more of the following features may be included. There may be a bumper affixed to the mid-section of the tubular mounting member and configured to be disposed between the mid-section and the back wall of a tractor unit. The bumper may be affixed to the mid-section via a bolt and nut. The bumper may comprise an overmolded rubber or EPDM (ethylene propylene diene terpolymer). The first attachment mechanism may include a U-shaped bracket formed on the end of first curved tubular member and the U-shaped bracket may be configured to receive the slider bar and the U-shaped bracket may be secured to slider bar using a stand-off element through which a bolt is inserted and secured using a nut. The second attachment mechanism may include a U-shaped bracket formed on the end of second curved tubular member and the U-shaped bracket may be configured to receive the slider bar and the U-shaped bracket may be secured to the slider bar using a stand-off element through which a bolt is inserted and secured using a nut. The first end section of the tubular mounting member may be connected to the second end of the first curved tubular member such that the first end section of the tubular mounting member is disposed at a non-zero angle relative to a plane formed by the tubular cross member intersecting, at a right angle, the back wall of the tractor unit. The second end section of the tubular mounting member may be connected to the second end of the second curved tubular member such that the second end section of the tubular mounting member is disposed at a non-zero angle relative to the plane formed by the tubular cross member intersecting, at a right angle, the back wall of the tractor unit.

BRIEF DESCRIPTION OF THE FIGURES

Embodiments of the present disclosure will now be described, by way of example only, with reference to the attached Figures, wherein.

DETAILED DESCRIPTION OF THE INVENTION

The disclosure and the various features and advantageous details thereof are explained more fully with reference to the non-limiting embodiments and examples that are described and/or illustrated in the accompanying drawings and detailed in the following description.

It should be noted that the features illustrated in the drawings are not necessarily drawn to scale, and features of one embodiment may be employed with other embodiments as the skilled artisan would recognize, even if not explicitly stated herein.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1:
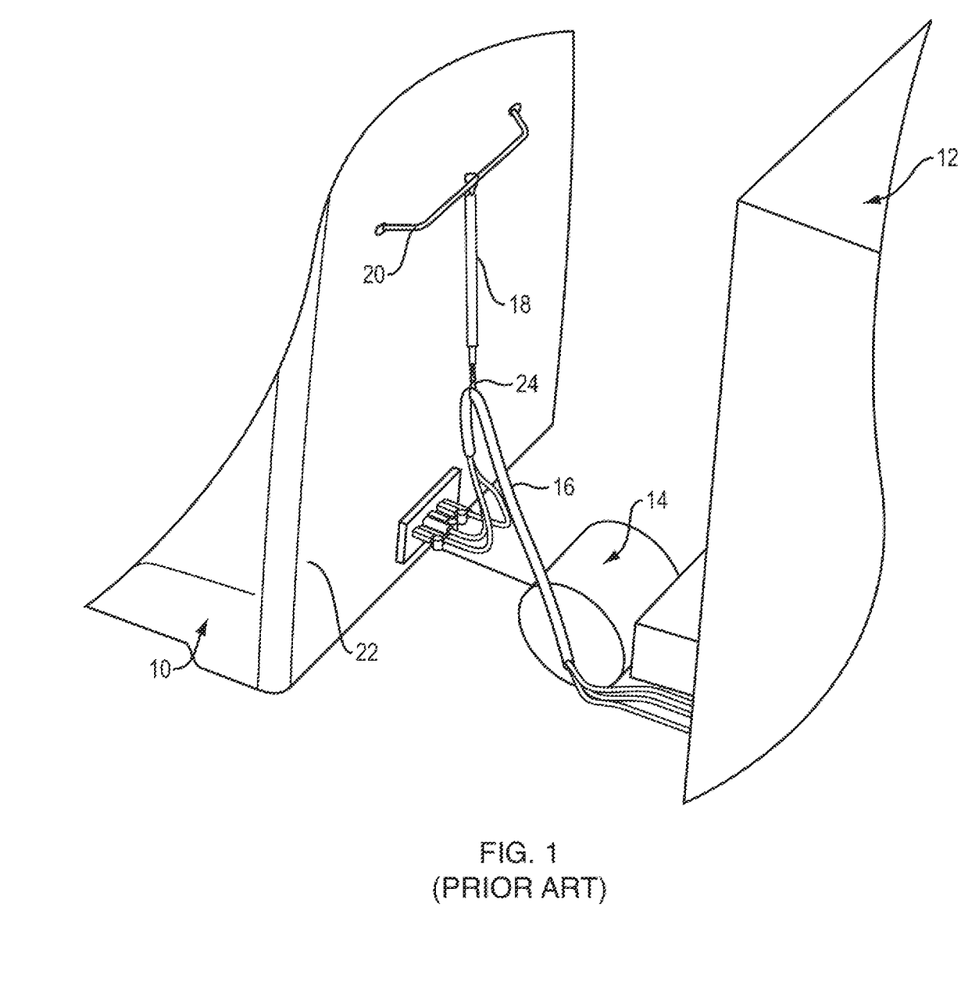
FIG. 1 shows a perspective view of a tractor trailer with a prior art slider bar and tender kit.

Referring to FIG. 1, there is shown a perspective view of tractor unit 10 interconnected to a trailer unit 12 via a catwalk 14. Sleeve 16, which contains hook-up lines, such as pneumatic, electrical, hydraulic or other hook-up lines, is shown interconnected between tractor unit 10 and trailer unit 12. A spring tender kit 18 is shown connected at one end to a slider bar 20 mounted on back wall 22 of tractor unit 10 and at its other end it is connected to a clamp 24 which itself is affixed to sleeve 16. The tender kit 18 connected to slider bar 20 is used to suspend the hook-up lines to keep them from rubbing on objects, like the back wall of the tractor unit or the top surface of the catwalk 14. It also is intended to keep them from getting into the proximity of heat sources or other moving parts. However, as described above, with slider bars and spring tender kits, the hook-up lines still tend to rub paint off the cab, drag onto the catwalk, become abraded, and/or provide inadequate slack for connections One prior art solution uses a slider bar extension 30, FIG. 2, which is available from Phillips Industries, to enable the spring tender kit to be connected at its top connection point further away from the back wall of the tractor unit. Extension 30 includes a mounting bracket 32, which attaches to a slider bar (not shown), affixed at one end of extension bar 34 and at the other end there is an eye-hook 36 to which the spring tender kit (not shown) is connected. Diagonal support bar 38 extends from its point of interconnection with extension bar 34 to support bracket 39. Support bracket 39 includes foam padding on its base which rests on the back wall of the tractor unit.

Figure 2:
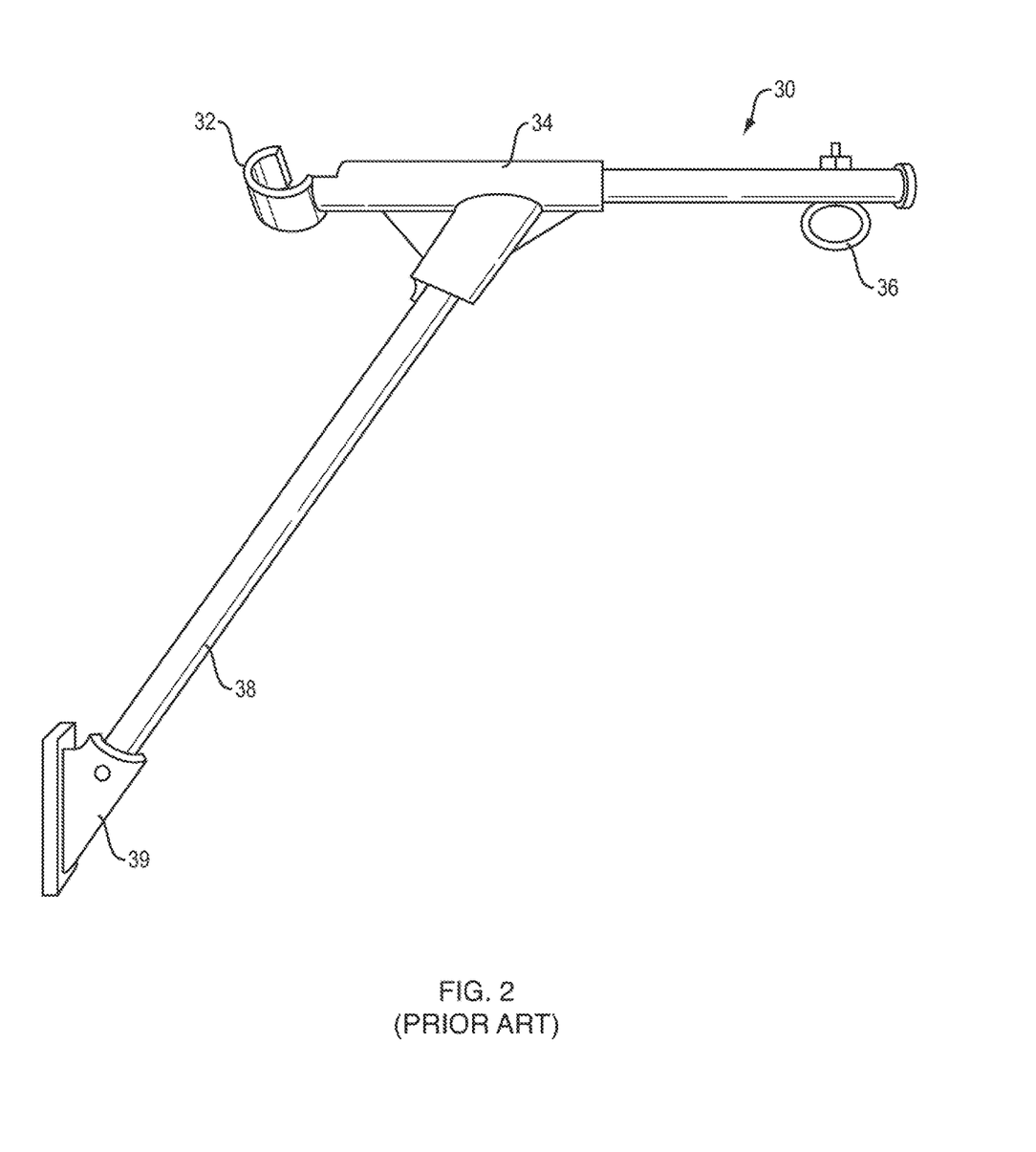
FIG. 2 shows a perspective view of a prior art slider bar extension.

Slider bar extension 30 which functions as a fixed bracket to hold the connection lines out further from the back of the cab to eliminate the certain of the issues identified above with slider bars, but this slider bar extension also eliminates the essential function of the slider bar, which to allow the connection lines to slide laterally along the bar to extend their reach during sharp tractor-trailer turns. In other words, as the tractor trailer turns, the slider bar extension 30 does not move laterally along the slider bar to extend the reach of the connection lines during sharp tractor-trailer turns.

Figure 3:
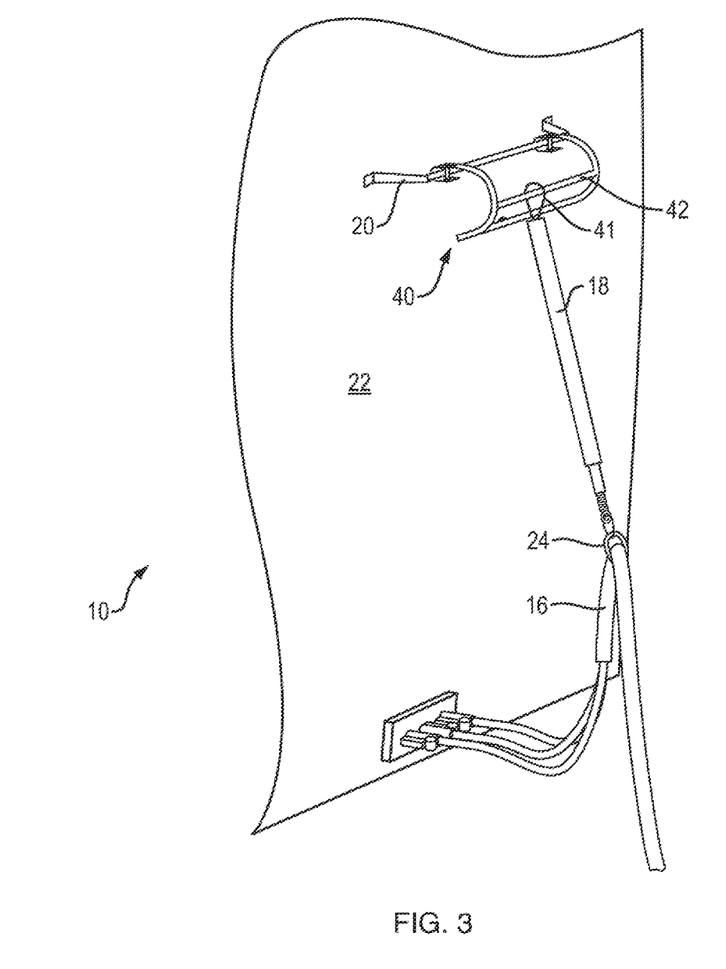
FIG. 3 shows a perspective view of a tractor trailer with a slider bar extension and tender kit according to an aspect of this invention.

A slider bar extension 40, according to an aspect of this invention, is shown in FIG. 3, affixed to slider bar 20 which is mounted on the back wall 22 of tractor unit 10. The same spring tender kit 18 is shown connected at one end to tubular cross member 42 of slider bar extension 40 via loop 41. A slider bar 20 mounted on back wall 22 of tractor unit 10. Just as shown in FIG. 1, spring tender kit 18, at its other end, is shown connected to clamp 24 which itself is affixed to sleeve 16. In this example, slider bar 20 may have a straight section length of approximately 14⅞" and the slider bar extension 40 is designed for this size slider bar. The clearance between the wall 22 of tractor unit 10 and this inside diameter of the slider bar 20 is approximately 2.5"-3"; however, this clearance may be larger or smaller depending on the tractor unit and the particular slider bar being used.

Referring to FIGS. 5A-E, slider bar extension 40 is shown to include a first curved tubular member 50 having a first end 49 with a first attachment mechanism 52 configured to be affixed to a first end 53 of the slider bar 20 and a second end 51 configured to extend below the slider bar 20 and spaced from the wall 22 of the tractor unit 10. First curved tubular member 50 may be a semi-circular in shape. Second curved tubular member 54 has a first end 55 with a second attachment mechanism 56 configured to be affixed to a second end 57 of the slider bar 20 and a second end 58 configured to extend below the slider bar 20 and spaced from the wall 22 of the tractor unit a distance equal to the spacing of second end 51 of the first curved tubular member 50. Second curved tubular member 54 may also be a semi-circular in shape.

Tubular cross member 42 may be affixed at a first end to a portion of the first curved tubular member 50 between the first end 49 and second end 51 and at a second end to a portion of the second curved member 54 between the first end 55 and second end 58. The tubular cross member 42 may be affixed to first curved tubular member 50 and the second curved tubular member 54 by welding or any other suitable means. The tubular cross member 42 may be affixed approximately at the apex of the first curved tubular member 50 (and the second curved tubular member 54) to provide the most clearance from backwall 22 when the tender kit 18 is connected to tubular cross member 42. There is a tubular mounting member 60 having a first curved end portion 61 and a second curved end portion 62 which interconnect, respectively, to ends 51 and 58 of first and second curved tubular members 50 and 54. Tubular mounting member 60 extends from the ends of the first and second curved tubular members 50 and 54 toward back wall 22 of tractor unit 10 where it may contact back wall 22 via, for example, an over-molded rubber bumper 64. The bumper 64 may also be formed of an over-molded EPDM (ethylene propylene diene terpolymer) or other suitable material. The bumper 64 may be affixed to tubular mounting member 60 via a bolt and nut. The bumper provides a solid interconnection to back wall 22 without abrading it. Tubular mounting member 60 also comprises a straight mid-section portion 66 interconnected between the first and second curved end section portions 61 and 62. The over-molded bumper 64 is affixed through mid-section portion 66.

Figure 5A:
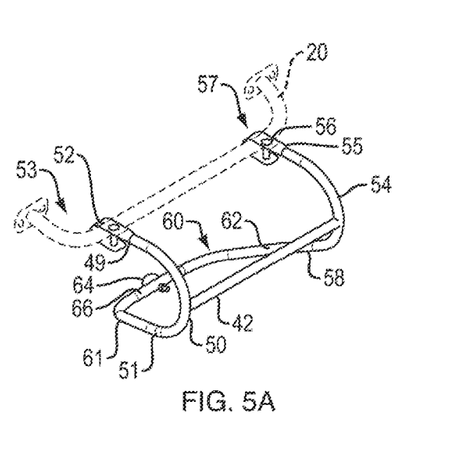
FIGS. 5A-5E show various views of the slider bar extension of FIG. 3.
Figure 5B:
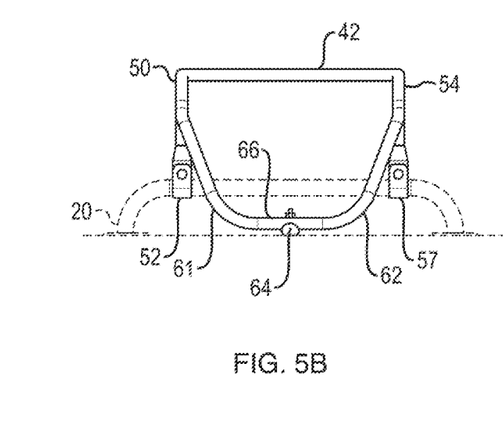
Figure 5C:
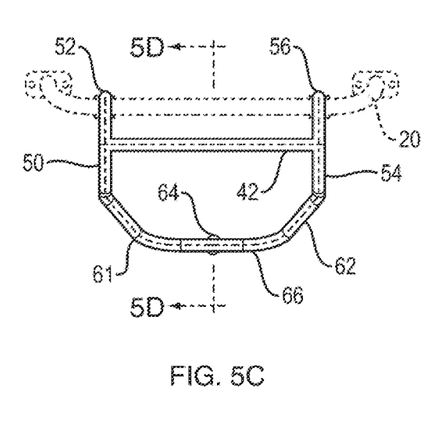
Figures 5D, 5E:
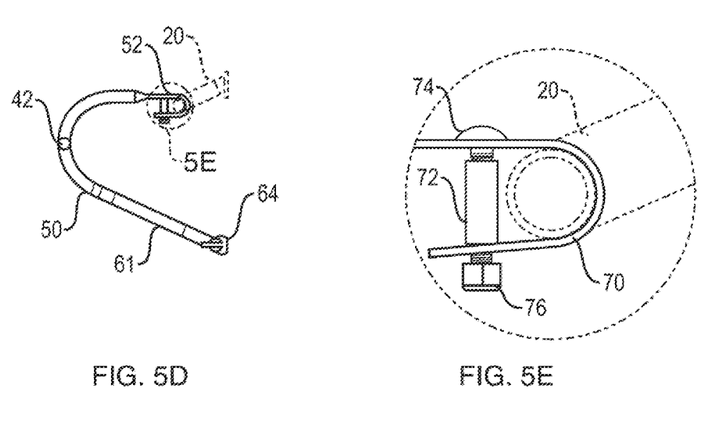

Referring to FIG. 5D specifically, in this exemplary embodiment, first curved tubular member 50 has a radius of curvature such that the angle of first curved end portion 61 relative to a plane formed by the tubular cross member 42 intersecting, at a right angle, the back wall 22 of tractor unit 10 is approximately 25 degrees. This angle may be greater or lesser depending on the spacing desired between the tubular cross member 42 and the back wall 22. With an angle less than 25 degrees, tubular cross member 42 will be spaced further from back wall 22 and with an angle greater than 25 degrees, tubular cross member 42 will be located closer to back wall 22. With the 25-degree angle, the distance from the slider bar 20 from point of attachment 52 to the point of interconnection of tubular cross member 42 is approximately 7 in. The distance from back wall 22 to slider bar 20 is approximately 3 inches, therefore, the slider bar extension provides a total clearance of approximately 10 inches. Of course, second curved tubular member 54 and second curved end portion 62 are configured similarly to first curved tubular member 42 and first curved end portion 61.

Referring to FIG. 5E, the detail of attachment mechanism 52 is shown to include a U-shaped bracket 70 formed on the end of first curved tubular member 50 in which is received the slider bar 20. The bracket is secured to slider bar 20 using stand-off 72 through which carriage bolt 74 is inserted and secured using a nylon lock nut 76. Attachment mechanism 56 is similarly configured.

The various tubular members may be formed of a polished stainless steel welded tube (e.g., SS 304) having an outside diameter of 19 mm, thickness of 1.25 mm. The tubular cross member 42 may be approximately 13⅜" in length and spaced from the back wall 22 a distance of approximately 10". As depicted in FIGS. 5A-D, near points of attachment at attachment mechanisms 52/56 the first curved tubular member 50 and the second curved tubular member 54 are disposed at a 90 degrees relative to slider bar 20. First and second curved tubular members are also disposed at a 90 degree angle relative to tubular cross member 42. As best seen in the bottom up view in FIG. 5B, the angle, θ, between first curved tubular member 50 and first curved end portion 61 is approximately 19 degrees. There is also an approximate 19-degree angle between second curved tubular member 52 and second curved end portion 62 Various other dimensions of components and angular orientations of components are depicted in FIGS. 5A-E. Of course, the dimensions and angles of FIGS. 5A-E are only exemplary and various dimensions and angles may be used.

Figure 4:
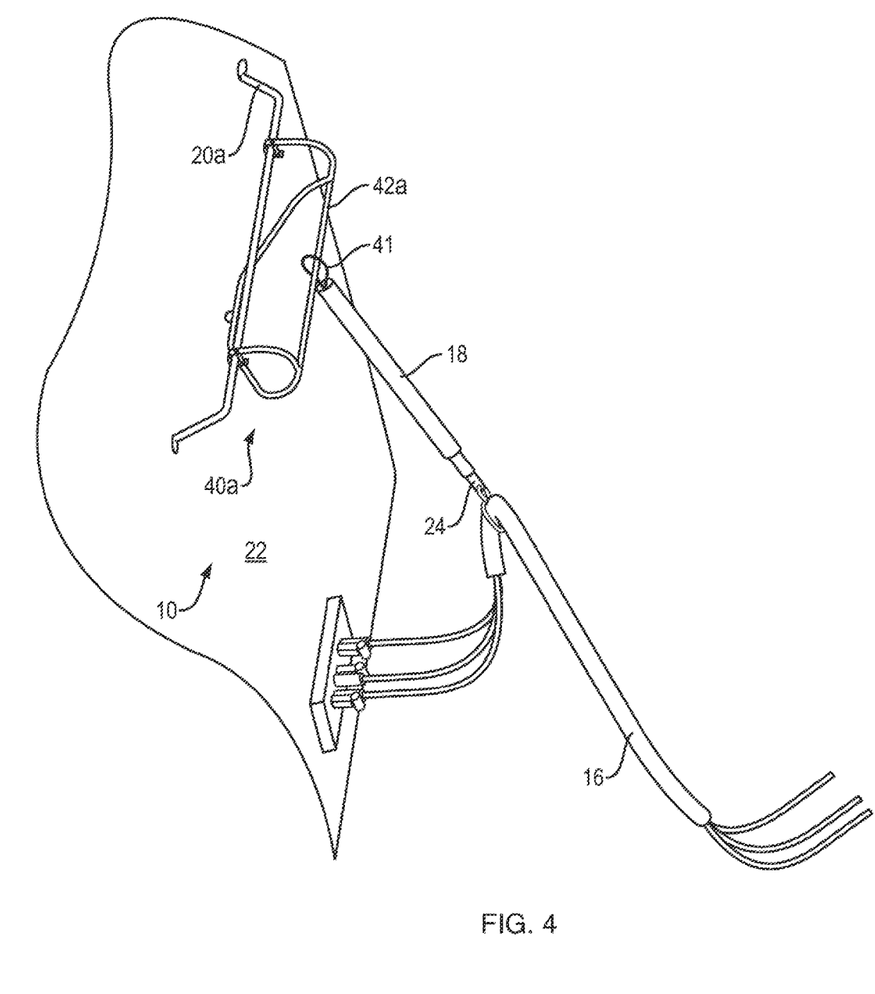
FIG. 4 shows a perspective view of a tractor trailer with a slider bar extension and tender kit according to another aspect of this invention.

Referring to FIG. 4, another example of a slider bar extension according to this invention is shown mounted on a larger slider bar 20a. In this example, slider bar 20a may have a larger straight section length than slider bar 20 and slider bar extension 40a may be designed for this size slider bar and also be longer in length than slider bar extension 40. Different length slider bar extensions according to this disclosure may be used to accommodate different size slider bars that exist in the market (varies by make/model of tractor) The clearance between the wall 22 of tractor unit 10 and the inside diameter of the slider bar 20a is approximately 4", which is also slightly larger than the clearance of slider bar 20, FIG. 3. Slider bar extension 40a has connected to it the same spring tender kit 18, described above, connected at one end to tubular cross member 42a via loop 41. At its other end, spring tender kit is connected to clamp 24 which itself is affixed to sleeve 16.

Referring to FIGS. 6A-E, slider bar extension 40a is shown to include a first curved tubular member 50a having a first end 49a with a first attachment mechanism 52a configured to be affixed to a first end 53a of the slider bar 20a and a second end 51a configured to extend below the slider bar 20a and spaced from the wall 22 of the tractor unit 10. First curved tubular member 50a may be a semi-circular in shape. Second curved tubular member 54a has a first end 55a with a second attachment mechanism 56a configured to be affixed to a second end 57a of the slider bar 20a and a second end 58a configured to extend below the slider bar 20a and spaced from the wall 22 of the tractor unit 10 a distance equal to the spacing of the second end 51a of the first curved tubular member 50a. Second curved tubular member 54a may also be a semi-circular in shape.

Tubular cross member 42a may be affixed at a first end to a portion of the first curved tubular member 50a between the first end 49a and second end 51a and at a second end to a portion of the second curved member 54a between the first end 55a and second end 58a by welding or other suitable means. Tubular cross member 42 may be affixed approximately at the apex of the first curved tubular member 50a (and the second curved tubular member 54a) to provide the most clearance from back wall 22 when the tender kit 18 is connected to tubular cross member 42a. There is a tubular mounting member 60a having a first curved end portion 61a and a second curved end portion 62a which interconnect, respectively, to ends 51a and 58a of first and second curved tubular members 50a and 54a. Tubular mounting member 60a extends from the ends of the first and second curved tubular members 50a and 54a toward back wall 22 of tractor unit 10 where it may contact back wall 22 via, for example, an over-molded rubber bumper 64a. Bumper 64a may be also be formed of an over-molded EPDM (ethylene propylene diene terpolymer) or other suitable material. The bumper 64a may be affixed to tubular mounting member 60a via a bolt and nut. The bumper provides a solid interconnection to back wall 22 without abrading it. Tubular mounting member 60a also comprises a straight mid-section portion 66a interconnected between the first and second curved end section portions 61a and 62a. The over-molded bumper 64 is affixed through mid-section portion 66.

Figure 6A:
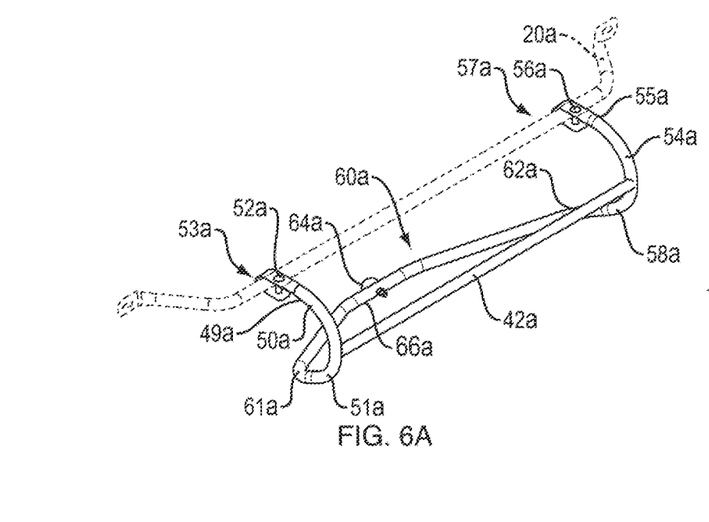
FIGS. 6A-6E show various views of the slider bar extension of FIG. 4.
Figure 6B:
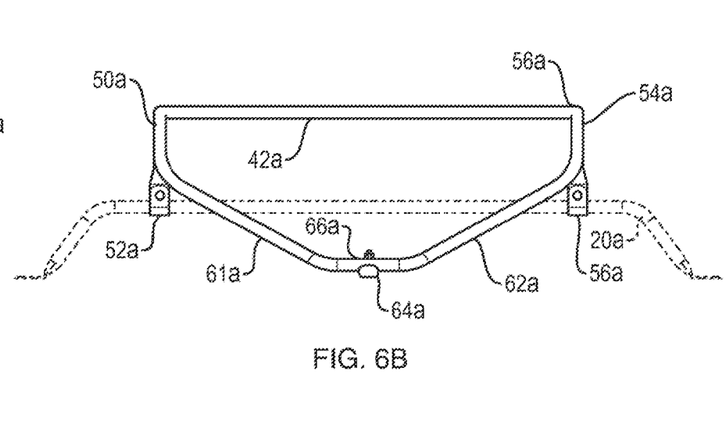
Figure 6C:
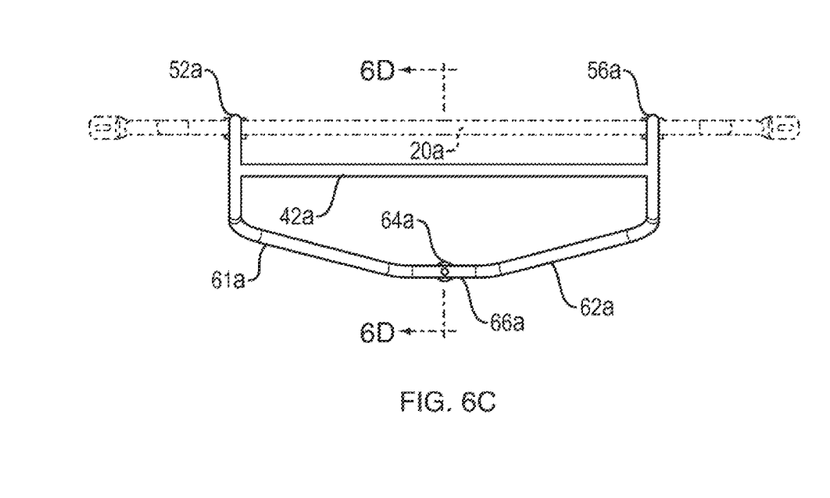
Figure 6D:
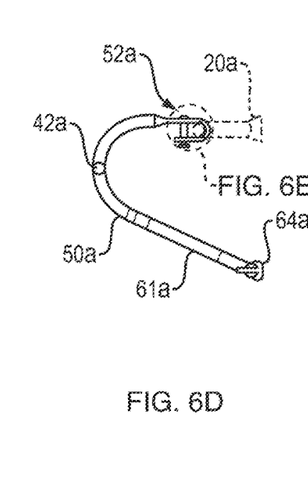

Referring to FIG. 6D specifically, first curved tubular member 50a has a radius of curvature such that the angle of first curved end portion 61a relative to a plane formed by the tubular cross member 42a intersecting, at a right angle, the back wall 22 of tractor unit 10 is approximately 25 degrees. This angle may be greater or lesser depending on the spacing desired between the tubular cross member 42a and the back wall 22. With an angle less than 25 degrees, tubular cross member 42a will be spaced further from back wall 22 and with an angle greater than 25 degrees, tubular cross member 42a will be located closer to back wall 22. With the 25 degree angle, the distance from the slider bar 20 from point of attachment 52a to the point of interconnection of tubular cross member 42a is approximately 5.75 in. The distance from back wall 22 to slider bar 20 is approximately 4.375 in., therefore, the slider bar extension provides a total clearance of approximately 10.125 in. Of course, second curved tubular member 54 and second curved end portion 62 are configured similarly to first curved tubular member 42 and first curved end portion 61.

Figure 6E:
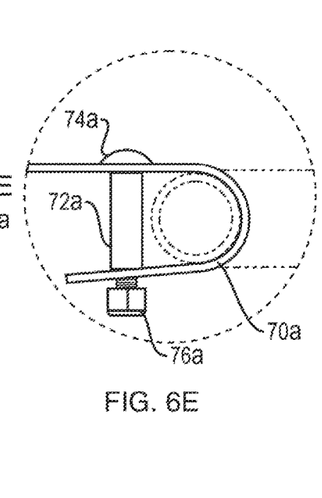

Referring to FIG. 6E, the detail of attachment mechanism 72a is shown to include a U-shaped bracket 70a formed on the end of first curved tubular members 70a in which is received the slider bar 20a. The bracket is secured to slider bar 20a using stand-off 72a through which carriage bolt 74a is inserted and secured using a nylon lock nut 76a. Attachment mechanism 56a is similarly configured.

The various tubular members may be formed of a polished stainless steel welded tube (e.g., SS 304), having an outside diameter of 19 mm, thickness of 1.25 mm. The tubular cross member 42 may be approximately 25½" in length and spaced from the back wall 22 a distance of approximately 10.125". As depicted in FIGS. 6A-D, near points of attachment at attachment mechanisms 52a/56a the first curved tubular member 50a and the second curved tubular member 54a are disposed at a 90 degrees relative to slider bar 20a. First and second curved tubular members are also disposed at a 90 degree angle relative to tubular cross member 42a. As best seen in the bottom up view in FIG. 5B, the angle, θa, between first curved tubular member 50a and first curved end portion 61a is approximately 58 degrees. There is also an approximate 58 degree angle between second curved tubular member 52a and second curved end portion 62a. Various other dimensions of components and angular orientations of components are depicted in FIGS. 6A-E. The dimensions and angles in FIGS. 6A-E are only exemplary and various sizes and dimensions may be used depending on the particular application.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The invention is therefore not limited by the above-described embodiments and examples, or embodiments and applications within the scope and spirit of the invention claimed as follows.

I claim:

1. An extension bracket for a slider bar configured to be mounted on a wall of a tractor unit of a semi-tractor trailer truck, the extension bracket comprising:
   a first curved tubular member having a first end with a first attachment mechanism configured to be affixed to a first end of a slider bar and a second end configured to extend below the slider bar, spaced from the wall of the tractor unit when the slider bar is mounted on the wall of the tractor unit;
   a second curved tubular member having a first end with a second attachment mechanism configured to be affixed to a second end of the slider bar, spaced from the first end along a length of the slider bar, and a second end configured to extend below the slider bar, spaced from the wall of the tractor unit when the slider bar is mounted on the wall of the tractor unit;
   a tubular cross member affixed at a first end to a portion of the first curved member between the first and second ends of the first curved tubular member and the tubular cross member affixed at a second end to a portion of the second curved member between the first and second ends of the second curved tubular member; and
   a tubular mounting member having a first end section connected the second end of the first curved tubular member and a second end section connected the second end of the second curved tubular member; the tubular mounting member further having a mid-section interconnected between the first and second end sections, wherein the mid-section is configured to be in contact with the wall of the tractor unit when the extension bracket on the slider bar.

2. The extension bracket of claim 1 further including bumper affixed to the mid-section of the tubular mounting member and configured to be disposed between the mid-section and the back wall of a tractor unit.

3. The extension bracket of claim 2 wherein the bumper is affixed to the mid-section via a bolt and nut.

4. The extension bracket of claim 2 wherein the bumper comprises one of an over-molded rubber or EPDM (ethylene propylene diene terpolymer).

5. The extension bracket of claim 1 wherein the first attachment mechanism includes a U-shaped bracket formed on the end of first curved tubular member and wherein the U-shaped bracket is configured to receive the slider bar and the U-shaped bracket is secured to slider bar using a stand-off element through which a bolt is inserted and secured using a nut.

6. The extension bracket of claim 5 wherein the second attachment mechanism includes a U-shaped bracket formed on the end of second curved tubular member and wherein the U-shaped bracket is configured to receive the slider bar and the U-shaped bracket is secured to slider bar using a stand-off element through which a bolt is inserted and secured using a nut.

7. The extension bracket of claim 1 wherein the first end section of the tubular mounting member is connected to the second end of the first curved tubular member such that the first end section of the tubular mounting member is disposed at a non-zero angle relative to a plane formed by the tubular cross member intersecting, at a right angle, the back wall of the tractor unit.

8. The extension bracket of claim 7 wherein the second end section of the tubular mounting member is connected to the second end of the second curved tubular member such that the second end section of the tubular mounting member is disposed at a non-zero angle relative to the plane formed by the tubular cross member intersecting, at a right angle, the back wall of the tractor unit.

* * * * *